United States Patent
Lee et al.

(10) Patent No.: US 9,989,804 B2
(45) Date of Patent: Jun. 5, 2018

(54) DISPLAY DEVICE

(71) Applicant: Samsung Display Co., LTD., Yongin-si, Gyeonggi-do (KR)

(72) Inventors: Jiwon Lee, Suwon-si (KR); Sangwon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 134 days.

(21) Appl. No.: 15/040,332

(22) Filed: Feb. 10, 2016

(65) Prior Publication Data

US 2016/0282669 A1    Sep. 29, 2016

(30) Foreign Application Priority Data

Mar. 26, 2015  (KR) .................. 10-2015-0042399

(51) Int. Cl.
  *G09F 13/08*   (2006.01)
  *G02F 1/1335*  (2006.01)

(52) U.S. Cl.
  CPC .. *G02F 1/133609* (2013.01); *G02F 1/133605* (2013.01); *G02F 1/133603* (2013.01); *G02F 1/133608* (2013.01)

(58) Field of Classification Search
  CPC ......... G02F 1/133608; G02F 1/133615; G02F 1/133616
  USPC ................................ 362/97.1, 97.2
  See application file for complete search history.

(56) References Cited

U.S. PATENT DOCUMENTS

| | | | |
|---|---|---|---|
| 2010/0085507 A1* | 4/2010 | Cho ................... | G02F 1/133308 349/62 |
| 2013/0321740 A1* | 12/2013 | An ....................... | H05K 5/0217 349/58 |
| 2014/0111974 A1* | 4/2014 | Choi ........................ | G09F 9/30 362/97.1 |

FOREIGN PATENT DOCUMENTS

| | | |
|---|---|---|
| KR | 1020070115185 A | 12/2007 |
| KR | 100819652 B1 | 4/2008 |
| KR | 1020090088514 A | 8/2009 |

* cited by examiner

*Primary Examiner* — Daniel St Cyr
(74) *Attorney, Agent, or Firm* — Cantor Colburn LLP

(57) ABSTRACT

A display device includes a display panel curved in a first direction, a light source comprising driving circuit boards and light emitting elements disposed on the driving circuit boards, a reflective sheet disposed on the driving circuit boards and including a first edge area, a second edge area spaced apart from the first edge area in the first direction, and a center area disposed between the first and second edge areas, where holes are defined in the center area to expose the light emitting elements, a cover member including a bottom portion on which the driving circuit boards are disposed and sidewalls bent from the bottom portion, a first correction tape disposed on the first edge area, and a second correction tape disposed on the second edge area.

19 Claims, 11 Drawing Sheets

DISPLAY DEVICE

This application claims priority to Korean Patent Application No. 10-2015-0042399, filed on Mar. 26, 2015, and all the benefits accruing therefrom under 35 U.S.C. § 119, the content of which in its entirety is herein incorporated by reference.

BACKGROUND

1. Field

The disclosure relates to a display device. More particularly, the disclosure relates to a curved display device including a direct-illumination type backlight unit.

2. Description of the Related Art

In recent years, a display device includes a backlight unit employing light emitting diodes ("LED"s) arranged as a light source thereof. The backlight unit including the LEDs may be classified into an edge-illumination type backlight unit and a direct-illumination type backlight unit, according to a position of the light source.

The edge-illumination type backlight unit typically includes the light emitting diodes arranged in a bar shape. The edge-illumination type backlight unit includes a light guide plate to allow a light to travel from an edge of the light guide plate to a front surface of a display panel. Different from the edge-illumination type backlight unit, the LEDs of the direct-illumination type backlight unit may be disposed under the display panel to provide the light directly to the display panel without using the light guide plate.

SUMMARY

In general, the backlight unit generates a white light by a combination of colors of red, green and blue LEDs. In case of the direct-illumination type backlight unit, LEDs disposed at a center portion of the LEDs generate substantially uniform white light using the color combination of the red, green and blue LEDS. However, the color combination of the red, green and blue LEDS disposed at edge portions among the LEDs may not be uniform, and thus the white light may not be effectively generated by the LEDs disposed at edge portions among the LEDs.

The disclosure provides a display device including a direct-illumination type backlight unit to generate a uniform white light.

The disclosure provides a display device having a curved shape.

Embodiments of the inventive concept provide a display device including a display panel curved in a first direction, a light source including a plurality of driving circuit boards and a plurality of light emitting elements disposed on the driving circuit boards, a reflective sheet disposed on the driving circuit boards and including a first edge area, a second edge area spaced apart from the first edge area in the first direction, and a center area disposed between the first and second edge areas, where a plurality of holes are defined in the center area to expose the light emitting elements, a cover member including a bottom portion, on which the driving circuit boards are disposed, and sidewalls bent from the bottom portion, a first correction tape disposed on the first edge area, a second correction tape disposed on the second edge area, and third correction tapes disposed on sidewalls facing each other in the first direction among the sidewalls. In such an embodiment, the first correction tape displays a first color different from a color of a light emitted from first edge light emitting elements disposed adjacent to the first edge area among the light emitting elements and the second correction tape displays a second color different from a color of a light emitted from second edge light emitting elements disposed adjacent to the second edge area among the light emitting elements.

In an embodiment, the first edge light emitting elements may include first light emitting elements which display one color of red, green, blue and cyan colors and second light emitting elements which display another color of the red, green, blue and cyan colors, and the second edge light emitting elements may include third light emitting elements which display another color of the red, green, blue and cyan colors and fourth light emitting elements which display the other color of the red, green, blue and cyan colors.

In an embodiment, the first light emitting elements may display one color of the red, green and blue colors, the second light emitting elements may display another color of the red, green and blue colors, and the first correction tape may displays the other color of the red, green and blue colors, as the first color.

In an embodiment, a third correction tape of the third correction tapes, which is disposed on a first sidewall adjacent to the first edge area among the sidewalls, may display the first color.

In an embodiment, the third light emitting elements may display one color of the red, green and blue colors, and the fourth light emitting elements may display a color obtained by mixing remaining two colors of the red, green and blue colors, which are not displayed by the third light emitting elements, as the second color.

In an embodiment, a third correction tape of the third correction tapes, which is disposed on a second sidewall adjacent to the second edge area among the sidewalls, may display the second color.

In an embodiment, the first correction tape may include a plurality of first color areas arranged at every first distance, and a third correction tape of the third correction tapes, which is disposed on a first sidewall adjacent to the first edge area among the sidewalls, may include a plurality of second color areas arranged at every second distance.

In an embodiment, a total sum of areas of the first color areas is greater than a total sum of areas of the second color areas.

In an embodiment, the first distance may be substantially equal to the second distance, and an area of each of the first color areas may be greater than an area of each of the second color areas.

In an embodiment, the first distance may be smaller than the second distance, and an area of each of the first color areas may be substantially equal to an area of each of the second color areas.

In an embodiment, the display device may further include a fourth correction tape disposed between the first edge light emitting elements and light emitting elements disposed most adjacent to the first edge light emitting elements, and a fifth correction tape disposed between the second edge light emitting elements and light emitting elements disposed most adjacent to the second edge light emitting elements.

In an embodiment, the fourth correction tape displays one color of the red, green and blue colors, which is substantially the same as the first color, and the fifth correction tape displays a color obtained by mixing remaining two colors of the red, green and blue colors, which is substantially the same as the second color.

In an embodiment, the first edge light emitting elements include first light emitting elements which display one color of the red, green and blue colors, and second light emitting elements which display another color of the red, green and blue colors, and the first correction tape may display the other color of the red, green and blue colors, as the first color.

In an embodiment, The second edge light emitting elements may include third light emitting elements which display the first color the same as the first correction tape among the red, green and blue colors, and fourth light emitting elements which display a cyan color, and the second correction tape may display a color obtained by mixing remaining two colors not displayed by the third light emitting elements among the red, green and blue colors as the second color.

In an embodiment, the first correction tape may display the green color as the first color, and the second correction tape may display a mixed color of the remaining two colors, as the second color.

In an embodiment, the second edge light emitting elements may include third light emitting elements which display substantially the same color as the first light emitting elements, and fourth light emitting elements which display substantially the same color as the second light emitting elements.

In an embodiment, the second correction tape may display the second color which is substantially the same as the first color.

In an embodiment, the display device may further include a fourth correction tape disposed on sidewalls facing each other in a second direction crossing the first direction among the sidewalls, and the fourth correction tape may be disposed at an edge area of the sidewalls facing each other in the second direction.

Embodiments of the inventive concept provide a display device including a display panel curved in a first direction, a light source including a plurality of driving circuit boards and a plurality of light emitting elements disposed on the driving circuit boards, a reflective sheet disposed on the driving circuit boards and including a first edge area, a second edge area spaced apart from the first edge area in the first direction, and a center area disposed between the first and second edge areas, where the light emitting elements are disposed in the center area, a bottom cover including a bottom portion on which the driving circuit boards are disposed and sidewalls bent from the bottom portion, a first correction tape disposed on the first edge area, and a second correction tape disposed on the second edge area. In such an embodiment, the first correction tape displays a first color different from a color of a light emitted from first edge light emitting elements disposed adjacent to the first edge area among the light emitting elements, the second correction tape displays a second color different from a color of a light emitted from second edge light emitting elements disposed adjacent to the second edge area among the light emitting elements, and at least one of the first and second edge light emitting elements is connected to a resistor in parallel.

According to embodiments, the backlight unit may emit uniform white light such that an overall driving capability of the display device may be improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
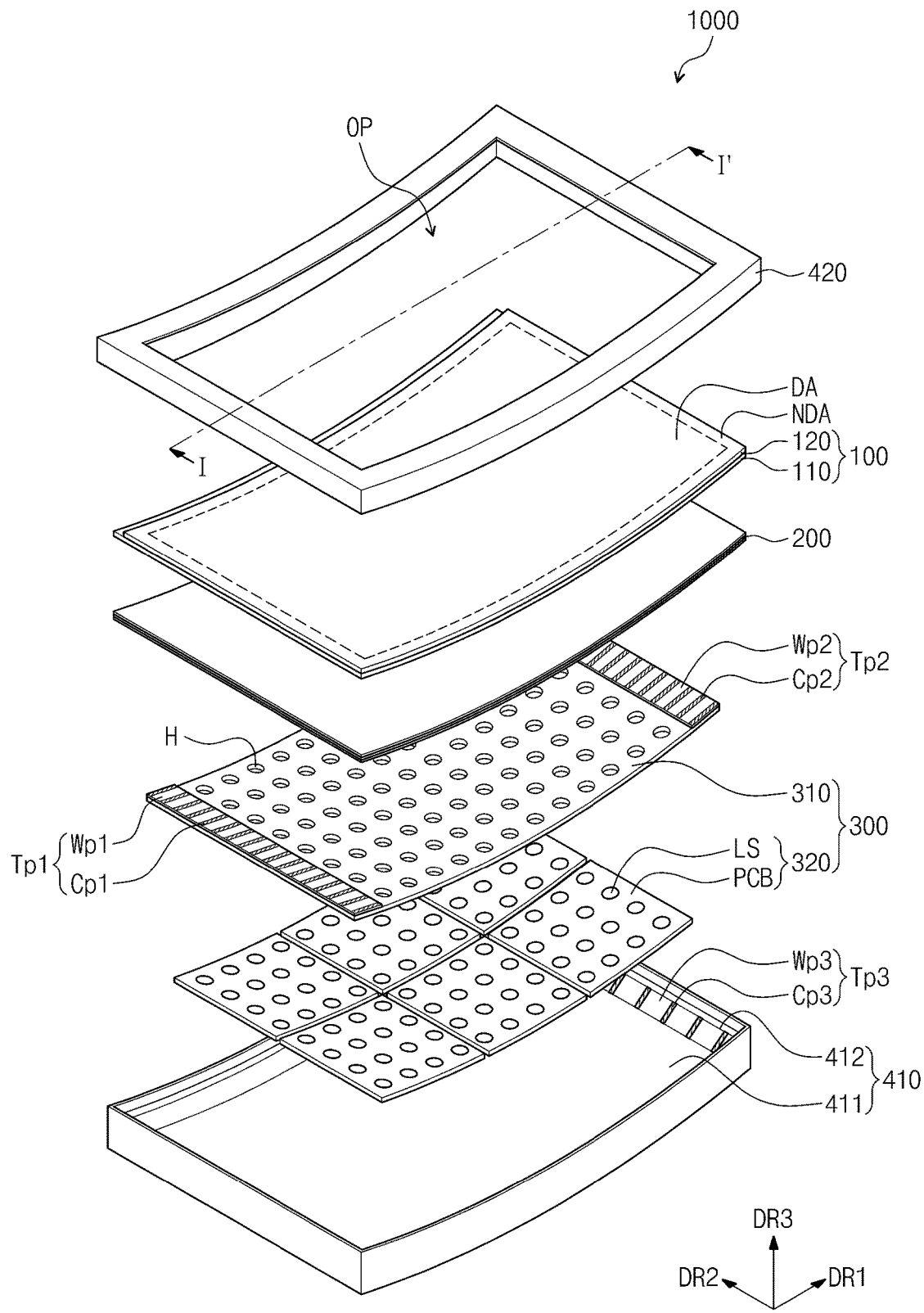
FIG. 1 is an exploded perspective view showing a display device according to an exemplary embodiment of the disclosure.

The invention now will be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. "Or" means "and/or." As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

FIG. 1 is an exploded perspective view showing a display device 1000 according to an exemplary embodiment of the disclosure.

Referring to FIG. 1, an exemplary embodiment of the display device 1000 includes a display panel 100, an optical member 200, a backlight unit 300, a first cover member 410, and a second cover member 420. The display panel 100 that displays an image is substantially parallel to a surface defined by a first direction DR1 and a second direction DR2. A normal line direction of the display panel 100 is defined as a third direction DR3, and the third direction DR3 may be a thickness direction of the display device 1000. In such an embodiment, front and rear surfaces of each member may be distinguished from each other by the third direction DR3.

Although not shown in figures, the display device 1000 may further include a mold member that supports the display panel 100 and the optical member 200.

According to an exemplary embodiment, the display panel 100 may be, but not limited to, a liquid crystal display panel, an electrophoretic display panel, or an electrowetting display panel. Hereinafter, an exemplary embodiment where the display panel 100 is the liquid crystal display panel including a liquid crystal layer will be described in detail for convenience of description, but not being limited thereto. In such an embodiment, the display panel 100 is disposed under the second cover member 420.

The display panel 100 includes a first substrate 110, a second substrate 120 opposite to, e.g., facing, the first substrate 110, and the liquid crystal layer (not shown) interposed between the first and second substrates 110 and 120. The display panel 100 includes a display area DA in which an image is displayed and a non-display area NDA in which driving devices to display the image are arranged.

The optical member 200 is disposed between the display panel 100 and the backlight unit 300. The optical member 200 receives a light from the backlight unit 300, improves optical characteristics of the light, and provides the light to the display panel 100. In an exemplary embodiment, the optical member 200 includes a diffusion member to uniformly diffuse the light incident thereto. In such an embodiment, the optical member 200 may further include a prism sheet that condenses the light from the diffusion member or a protective sheet that protects the prism sheet. In such an embodiment, the optical member 200 may further include other optical sheets.

The backlight unit 300 may be disposed under the optical member 200 and provide the light to the display panel 100 through the optical member 200. The display panel 100 displays the image using the light provided from the backlight unit 300.

The backlight unit 300 includes a reflective sheet 310 and a light source 320.

According to an exemplary embodiment, a plurality of holes H is defined through the reflective sheet 310 to expose a plurality of light emitting elements LS. The reflective sheet 310 is disposed under the optical member 200 to reflect the light incident to rear and side portions thereof from the light emitting elements LS and to provide the reflected light to the optical member 200.

The light source 320 includes the light emitting elements LS that emit the light and a plurality of driving circuit boards PCB on which the light emitting elements LS are disposed. In one exemplary embodiment, as shown in FIG. 1, six driving circuit boards PCB and at least one light emitting element is disposed on each driving circuit board. In such an embodiment, the light emitting elements LS may include light emitting diodes.

The light emitting elements LS may be inserted into the holes H, respectively. In an exemplary embodiment, the light emitting elements LS are inserted into the holes H of the reflective sheet 310 along the third direction DR3, and thus the reflective sheet 310 and the driving circuit boards PCB are coupled to each other.

In an exemplary embodiment, the light emitting elements LS are arranged on each driving circuit board PCB at regular intervals in the first and second directions DR1 and DR2.

In an exemplary embodiment, each of the driving circuit boards PCB may have substantially a square shape, but the shape of the driving circuit boards PCB should not be limited to the square shape. In such an embodiment, the light emitting elements LS may be arranged on each driving circuit board PCB, but not being limited thereto or thereby. Alternatively, the light emitting elements LS may be arranged on a single driving circuit board.

As described above, the display panel 100 displays an image based on the light provided from the backlight unit 300. When the display panel 100 displays the image, a color stain may occur at both edge areas of the display panel 100 in the first direction DR1 due to non-uniform color combination of the light emitted from the light emitting elements disposed adjacent to opposing edge areas of the reflective sheet 310.

According to an exemplary embodiment, a correction tape is disposed at both edge areas of the reflective sheet 310. The reflective sheet 310 includes a first edge area, a second edge area, and a center area. The first and second edge areas respectively correspond to the opposing side edge areas of the reflective sheet 310, and the center area is disposed between the first and second edge areas of the reflective sheet 310. In such an embodiment, the holes H, into which the light emitting elements LS are inserted, may be defined in the center area of the reflective sheet 310.

In an exemplary embodiment, as shown in FIG. 1, a first correction tape Tp1 is disposed on, e.g., attached to, the first edge area of the reflective sheet 310, and a second correction tape Tp2 is disposed on, e.g., attached to, the second edge area of the reflective sheet 310. The first correction tape Tp1 has short sides in the first direction DR1 and long sides in the second direction DR2 and is disposed on the reflective sheet 310. The first correction tape Tp1 may have a color different from that of the lights emitted from the light emitting elements disposed adjacent to the first edge area of the reflective sheet 310. Hereinafter, the light emitting elements disposed adjacent to the first edge area of the reflective sheet 310 are referred to as first edge light emitting elements. In such an embodiment, a first edge area of the display panel 100 overlaps at least a portion of the first edge area of the reflective sheet 310 in the third direction DR3.

The color combination of the lights emitted from the first light emitting elements may become uniform by the first correction tape Tp1. In such an embodiment, the first correction tape Tp1 reflects the light having the same color as its color and absorbs the light having different color from its color.

In an exemplary embodiment, the first correction tape Tp1 includes a plurality of first color areas Cp1 having a first color and a plurality of first colorless areas Wp1. The first correction tape Tp1 has one of red, green and blue colors as the first color. The first color areas Cp1 and the first colorless areas Wp1 have long sides in the first direction DR1 and short sides in the second direction DR2. The first color areas Cp1 are repeatedly and alternately arranged with the first colorless areas Wp1 in the second direction DR2.

The second correction tape Tp2 has short sides in the first direction DR1 and long sides in the second direction DR2 and is disposed in the second edge area. The second correction tape Tp2 may have a color different from that of the lights emitted from the light emitting elements disposed adjacent to the second edge area of the reflective sheet 310. Hereinafter, the light emitting elements disposed adjacent to the second edge area are referred to as second edge light emitting elements. In such an embodiment, a second edge area of the display panel 100 overlaps at least a portion of the second edge area of the reflective sheet 310 in the third direction DR3.

The color combination of the lights emitted from the second light emitting elements may become uniform by the second correction tape Tp2. In such an embodiment, the second correction tape Tp2 reflects the light having the same color as its color and absorbs the light having different color from its color.

In an exemplary embodiment, the second correction tape Tp2 includes a plurality of second color areas Cp2 having a second color and a plurality of second colorless areas Wp2. The second correction tape Tp2 has a mixed color of the other two colors of the red, green, and blue colors as the second color. The second color areas Cp2 and the second colorless areas Wp2 have long sides in the first direction DR1 and short sides in the second direction DR2. The second color areas Cp2 are repeatedly and alternately arranged with the second colorless areas Wp2 in the second direction DR2. In an exemplary embodiment, the first color and the second color are different from each other.

In an exemplary embodiment, the first and second colors are the same as each other. In an exemplary embodiment, the first and second correction tapes Tp1 and Tp2 are respectively disposed in the first and second edge areas of the reflective sheet 310, but not being limited thereto or thereby. Alternatively, the first and second correction tapes Tp1 and Tp2 may be respectively disposed at both edge areas of the reflective sheet 310 in the second direction DR2.

The first and second cover members 410 and 420 accommodate and protect the display panel 100, the optical member 200 and the backlight unit 300. The first cover member 410 is disposed under the backlight unit 300 to accommodate the display panel 100, the optical member 200 and the backlight unit 300. The second cover member 420 is disposed above the display panel 100, and an opening OP is defined through the second cover member 420 to expose the display area DA of the display panel 100.

The first cover member 410 includes a bottom portion 411 and sidewalls 412. The bottom portion 411 has long sides in the first direction DR1 and short sides in the second direction DR2. The sidewalls 412 extend from edges of the bottom portion 411 in the third direction DR3.

In an exemplary embodiment, a third correction tape Tp3 is disposed on, e.g., attached to, both sidewalls facing each other in the first direction DR1 among the sidewalls 412. In such an embodiment, the third correction tape Tp3 reflects the light having the same color as its color and absorbs the light having different color form its color. The third correction tape Tp3 includes a plurality of third color areas Cp3 and a plurality of third colorless areas Wp3 to correct the color combination of the lights. The third color areas Cp3 and the third colorless areas Wp3 have long sides in the first direction DR1 and short sides in the second direction DR2. The third color areas Cp3 are repeatedly and alternately arranged with the third colorless areas Wp3 in the second direction DR2.

As described above, the first, second and third correction tapes Tp1, Tp2 and Tp3 allow the color combination of the lights emitted from the first and second light emitting elements to be substantially uniform. As a result, the color stain may be effectively prevented from occurring at the both edge areas of the display panel 100.

In an exemplary embodiment, the display device 1000 may have a curved shape in a direction. In an exemplary embodiment, as shown in FIG. 1, the display device 1000 has the curved shape in the first direction DR1.

Figure 2:
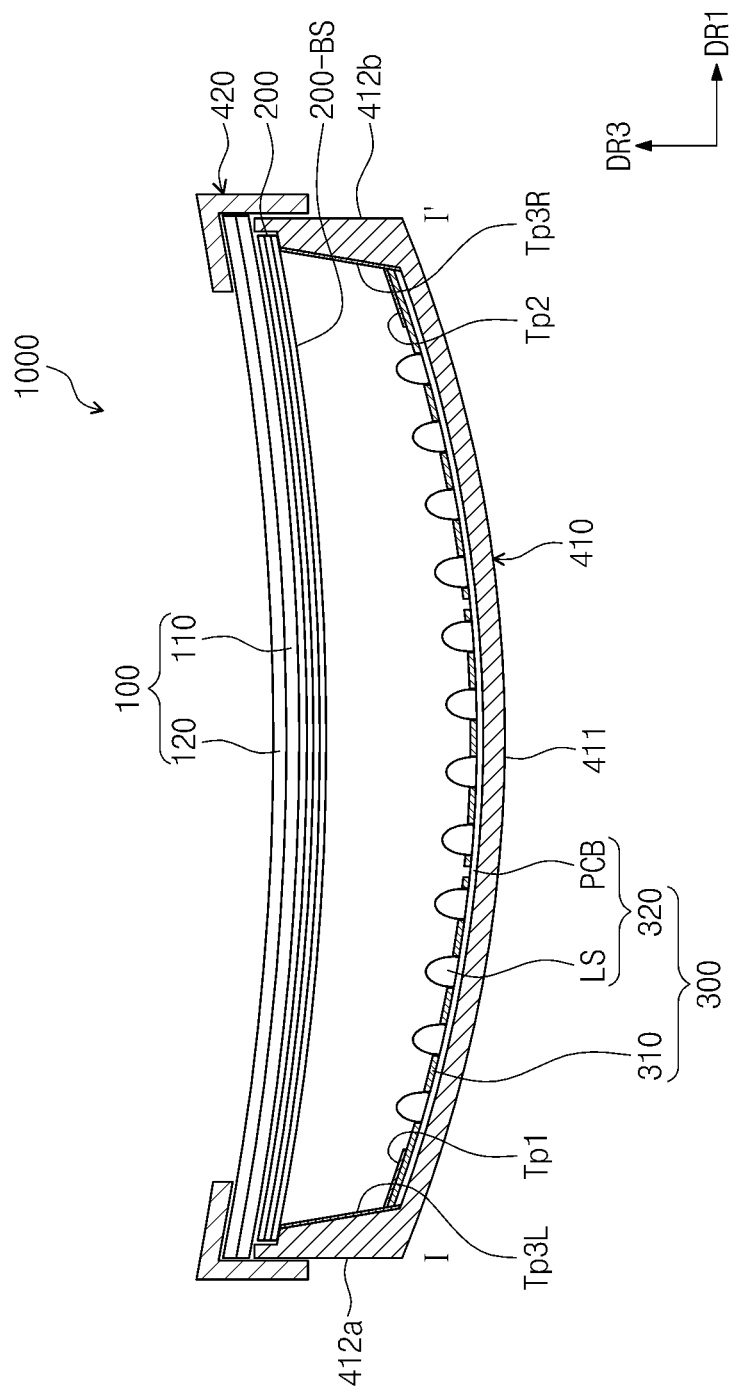
FIG. 2 is a cross-sectional view taken along line I-I' shown in FIG. 1.

FIG. 2 is a cross-sectional view taken along line I-I' shown in FIG. 1.

Referring to FIGS. 1 and 2, in an exemplary embodiment, the first cover member 410 is disposed at a lowermost position. In an exemplary embodiment, the first cover member 410 includes the bottom portion 411, and first and second sidewalls 412a and 412b bent from the bottom portion 411 at a predetermined angle. In such an embodiment, the first and second sidewalls 412a and 412b correspond to sidewalls facing each other in the first direction DR1 among the sidewalls 412 shown in FIG. 1. The driving circuit boards PCB and the light emitting elements LS disposed on the driving circuit boards PCB are disposed on the bottom portion 411. In such an embodiment, the reflective sheet 310 is disposed on the driving circuit boards PCB. In such an embodiment, the light emitting elements LS are inserted into the holes H of the reflective sheet 310.

In an exemplary embodiment, the first correction tape Tp1 is disposed in the first edge area of the reflective sheet 310, and the second correction tape Tp2 is disposed in the second edge area of the reflective sheet 310.

In such an embodiment, the third correction tape Tp3 includes a third correction tape Tp3L disposed on the first sidewall 412a and a third correction tape Tp3R disposed on the second sidewall 412b.

In such an embodiment, a stepped portion is defined or formed at ends in the third direction DR3 of the first and second sidewalls 412a and 412b. The optical member 200 is disposed on the stepped portion of the first and second sidewalls 412a and 412b. The display panel 100 is disposed on an upper end of the first and second sidewalls 412a and 412b. The second cover member 420 is disposed to surround the display panel 100.

Figure 3:
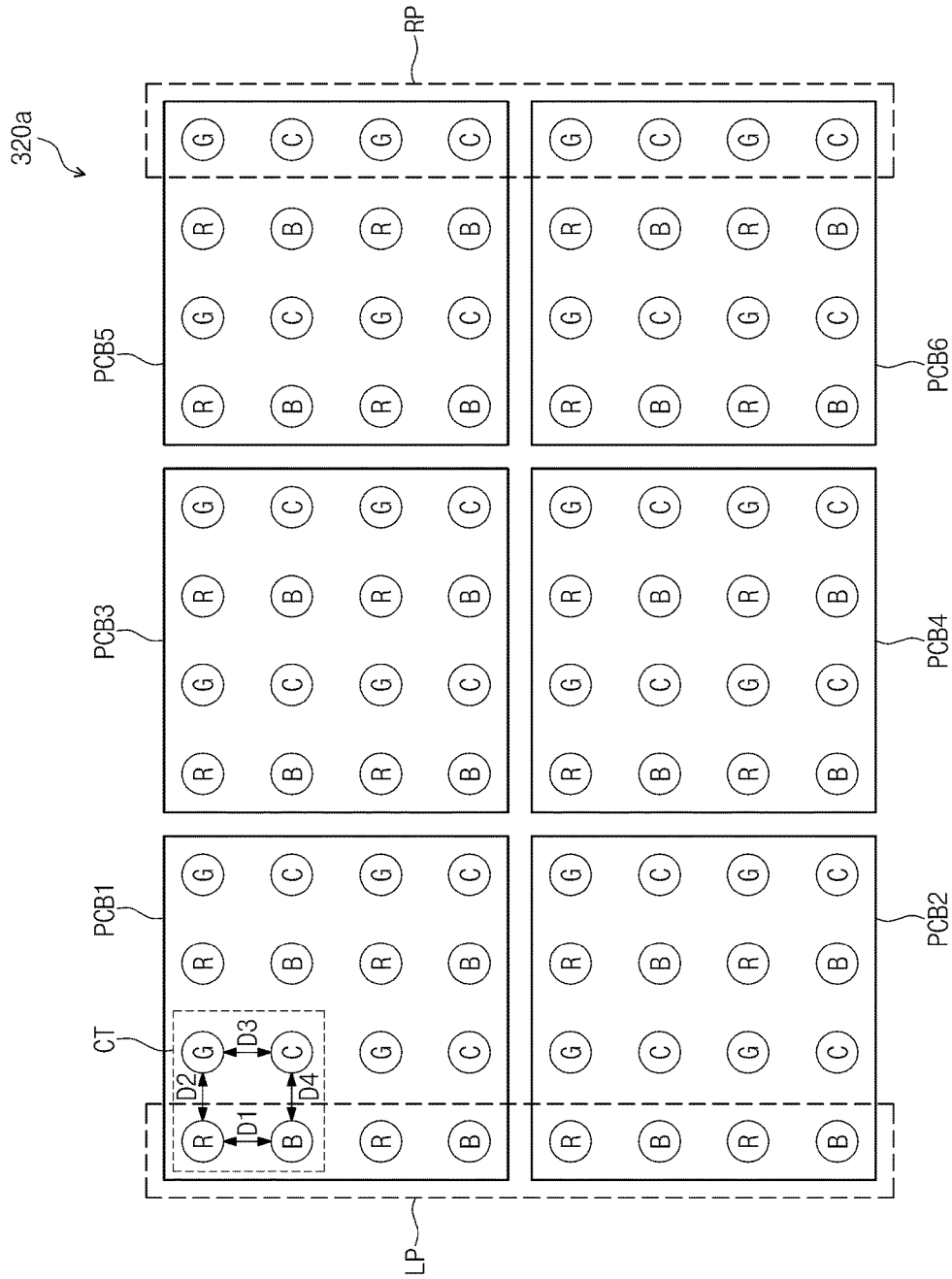
FIG. 3 is a view showing light emitting elements arranged in driving circuit boards shown in FIG. 1 according to an exemplary embodiment of the disclosure.
Figure 4:
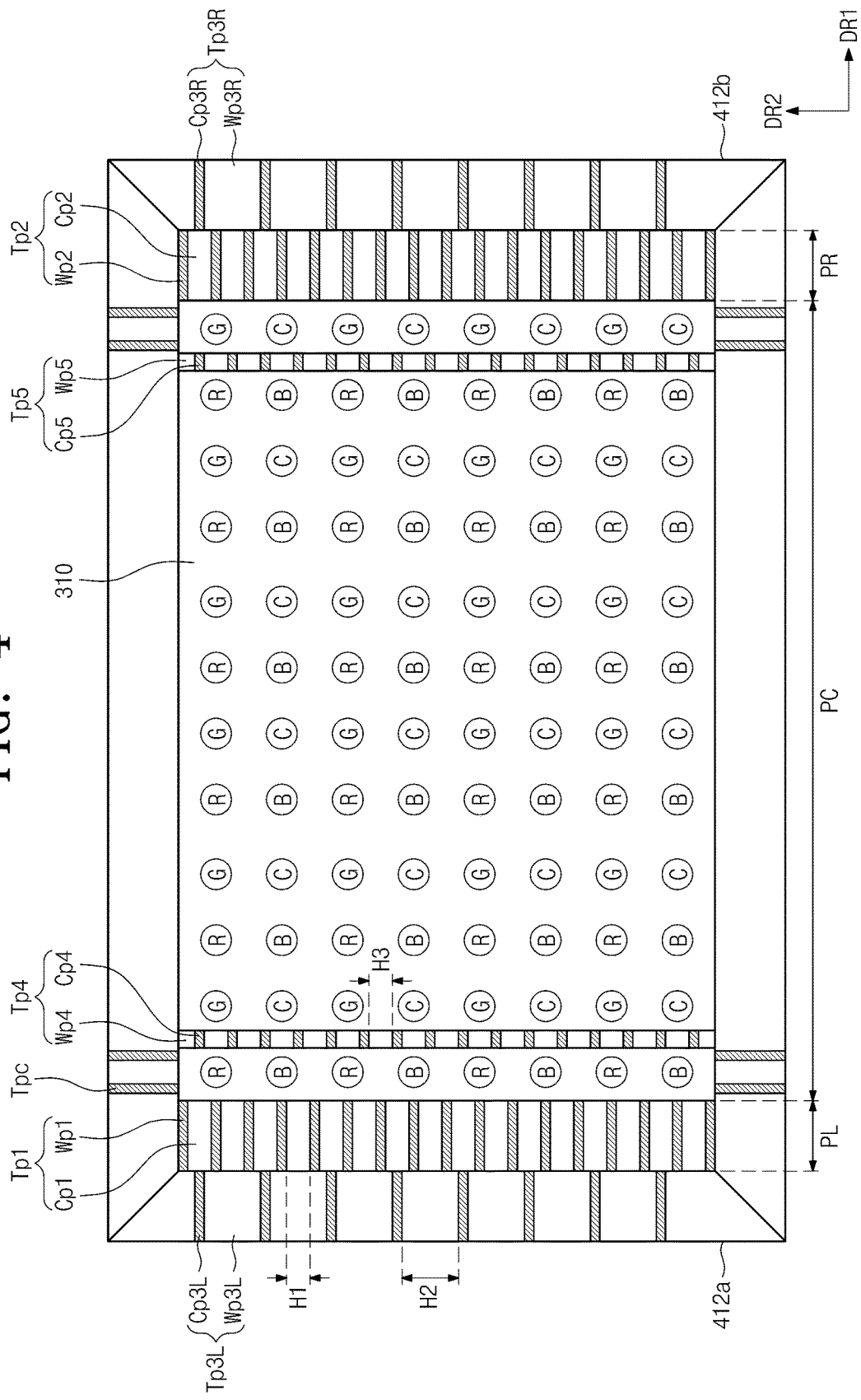
FIG. 4 is a view showing a coupling structure between the driving circuit boards and a reflective sheet shown in FIG. 1 according to an exemplary embodiment of the disclosure.

FIG. 3 is a view showing the light emitting elements arranged in the driving circuit boards shown in FIG. 1 according to an exemplary embodiment of the disclosure, and FIG. 4 is a view showing a coupling structure between the driving circuit boards and the reflective sheet shown in FIG. 1 according to an exemplary embodiment of the disclosure.

Referring to FIGS. 3 and 4, in an exemplary embodiment, a light source 320a includes a plurality of first to sixth driving circuit boards PCB1 to PCB6. In an exemplary embodiment, as shown in FIGS. 3 and 4, the first to sixth driving circuit boards PCB1 to PCB6 may be disposed on the bottom portion 411, but not being limited thereto or thereby. In such an embodiment, the number of the driving circuit boards PCB1 to PCB6 should not be limited to six. In an alternative exemplary embodiment, the light source 320a may include a single driving circuit board.

The light emitting elements LS (refer to FIG. 1) are disposed on each of the first to sixth driving circuit boards PCB1 to PCB6. Each of the light emitting elements may correspond to one of a red light emitting element R, a green light emitting element G, a blue light emitting element B, and a cyan light emitting element C.

In an exemplary embodiment, the light emitting elements of each of the first to sixth driving circuit boards PCB1 to PCB6 are arranged in a cluster CT structure. Here, the cluster CT structure means that the red light emitting element R, the green light emitting element G, the blue light emitting element B, and the cyan light emitting element C are arranged in a square shape. In such an embodiment, the red and blue light emitting elements R and B are spaced apart from each other by a first distance D1, the red and green light emitting elements R and G are spaced apart from each other by a second distance D2, the green and cyan light emitting elements G and C are spaced apart from each other by a third distance D3, and the cyan and blue light emitting elements C and B are spaced apart from each other by a fourth distance D4. In an exemplary embodiment, the first to fourth distances D1 to D4 may be substantially the same as each other.

Hereinafter, the four cluster structures defined by the light emitting elements arranged on each of the first to sixth driving circuit boards PCB1 to PCB6 will be described.

The cluster CT structure having the square shape includes the red light emitting element R, the green light emitting element G, the blue light emitting element B, and the cyan light emitting element C, which are arranged in first and second rows.

In an exemplary embodiment, as shown in FIG. 3, the cluster CT includes the red light emitting element R and the green light emitting element G, which are sequentially arranged in the first row, and the cluster CT includes the blue light emitting element B and the cyan light emitting element C, which are sequentially arranged in the second row. In such an embodiment, the red and blue light emitting elements R and B are arranged in the same column and the green and cyan light emitting elements G and C are arranged in the same column.

In such an embodiment, the cluster CT structure is repeatedly arranged on each of the first to sixth driving circuit boards PCB1 to PCB6 in rows and columns.

Hereinafter, as described above, the light emitting elements disposed most adjacent to the first edge area (e.g., the left side edge area) of the reflective sheet 310 are referred to as the first edge light emitting elements LP and the light emitting elements disposed most adjacent to the second edge area (e.g., the right side edge area) of the reflective sheet 310 are referred to as the second edge light emitting elements RP.

In such an embodiment, as shown in FIG. 3, the first edge light emitting elements LP include the red and blue light emitting elements R and B. The red and blue light emitting elements R and B of the first edge light emitting elements LP may be repeatedly arranged on the first and second driving circuit boards PCB1 and PCB2 along the column direction.

In such an embodiment, the second edge light emitting elements RP include the green and cyan light emitting elements G and C. The green and cyan light emitting elements G and C of the second edge light emitting elements RP may be repeatedly arranged on the fifth and sixth driving circuit boards PCB5 and PCB6 along the column direction.

Referring to FIG. 4, the reflective sheet 310 includes the first edge area PL, the second edge area PR, and the center area PC including the holes H formed therethrough into which the light emitting elements LS are inserted.

In an exemplary embodiment, the first correction tape Tp1 is disposed in the first edge area PL. The first correction tape Tp1 includes the first color areas Cp1 and the first colorless areas Wp1. The first color areas Cp1 are repeatedly arranged in the first correction tape Tp1 at every first distance H1. In such an embodiment, the first distance H1 corresponds to a width in the second direction DR2 of the first colorless areas Wp1.

In an exemplary embodiment, the second correction tape Tp2 is disposed in the second edge area PR. The second correction tape Tp2 includes the second color areas Cp2 and the second colorless areas Wp2. The second color areas Cp2 are repeatedly arranged in the second correction tape Tp2 at every first distance H1. In such an embodiment, the first distance H1 corresponds to a width in the second direction DR2 of the second colorless areas Wp2.

The third correction tape Tp3L, which is disposed on the first sidewall 412a, includes first sub-color areas Cp3L arranged at every second distance H2 and first sub-colorless area Wp3L alternately disposed with the first sub-color areas Cp3L. The first sub-color areas Cp3L are repeatedly arranged in the third correction tape Tp3L disposed on the first sidewall 412a at every second distance H2. In such an embodiment, the second distance H2 corresponds to a width in the second direction DR2 of the first sub-colorless areas Wp3L.

The third correction tape Tp3R, which is disposed on the second sidewall 412b, includes second sub-color areas Cp3R arranged at every second distance H2 and second sub-colorless areas Wp3R alternately disposed with the second sub-color areas Cp3R. The second sub-color areas Cp3R are repeatedly arranged in the third correction tape Tp3R disposed on the second sidewall 412b at every second distance H2. In such an embodiment, the second distance H2 corresponds to a width in the second direction DR2 of the second sub-colorless areas Wp3R.

The correction tapes Tpc may further be disposed at both edge areas in the second direction DR2 of the third and fourth sidewalls among the sidewalls 412 of the reflective sheet 310.

In an exemplary embodiment, the first distance H1 is smaller than the second distance H2, and thus a total sum of the areas of the first color areas Cp1 disposed in the first correction tape Tp1 is greater than a total sum of the areas of the first sub-color areas Cp3L disposed in the third correction tape Tp3L. In such an embodiment, the area of each of the first color areas Cp1 is substantially the same as the area of each of the first sub-color areas Cp3L.

In an exemplary embodiment, although not shown in figures, the first distance H1 may be equal to the second distance H2. In such an embodiment, the area of each of the first color areas Cp1 may be greater than the area of each of the first sub-color areas Cp3L.

In an exemplary embodiment, where a green color component among the color combinations of the lights emitted from the first edge light emitting elements LP may not be sufficient or relatively less than other components, the first color displayed in the first color areas Cp1 may be green. In an exemplary embodiment, where a magenta color component among the color combinations of the lights emitted from the second edge light emitting elements RP may not be sufficient or relatively less than other components, the second color displayed in the second color areas Cp2 may be magenta.

In such an embodiment, a fourth correction tape Tp4 may be disposed between the first edge light emitting elements LP and the light emitting elements disposed most adjacent to the first edge light emitting elements LP. The fourth correction tape Tp4 includes a plurality of fourth color areas Cp4 having the first color and a plurality of fourth colorless areas Wp4. The fourth color areas Cp4 are repeatedly and alternately arranged with the fourth colorless areas Wp4 in the second direction DR3. In an exemplary embodiment, the fourth color areas Cp4 are repeatedly arranged in the fourth correction tape Tp4 at every third distance H3. In such an embodiment, the third distance H3 corresponds to a width in the second direction DR2 of the fourth colorless areas Wp4.

In an exemplary embodiment, a fifth correction tape Tp5 may be disposed between the second edge light emitting elements RP and the light emitting elements disposed most adjacent to the second edge light emitting elements RP. The fifth correction tape Tp5 includes a plurality of fifth color areas Cp5 having the second color and a plurality of fifth colorless areas Wp5. The fifth color areas Cp5 are repeatedly and alternately arranged with the fifth colorless areas Wp5 in the second direction DR3. In an exemplary embodiment, the fifth color areas Cp5 are repeatedly arranged in the fifth correction tape Tp5 at every third distance H3. In such an embodiment, the third distance H3 corresponds to a width in the second direction DR2 of the fifth colorless areas Wp5.

In an exemplary embodiment, the third distance H3 may be substantially equal to the first distance H1, but not being limited thereto or thereby.

Figure 5:
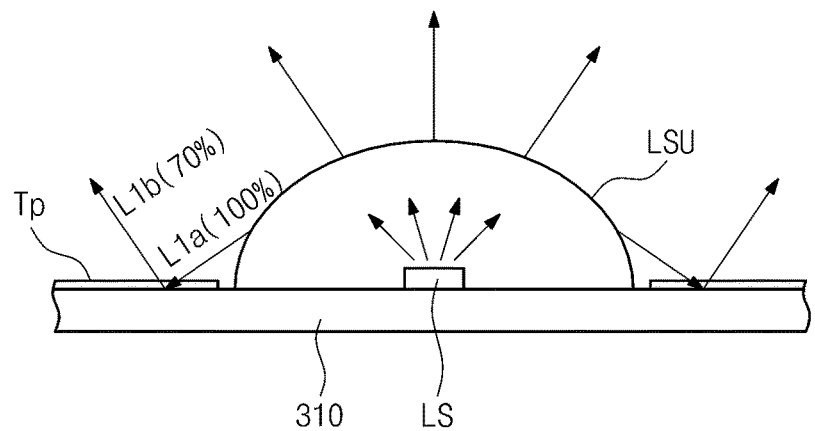
FIGS. 5 and 6 are views showing absorption or reflection of a correction tape as a function of a light output.
Figure 6:
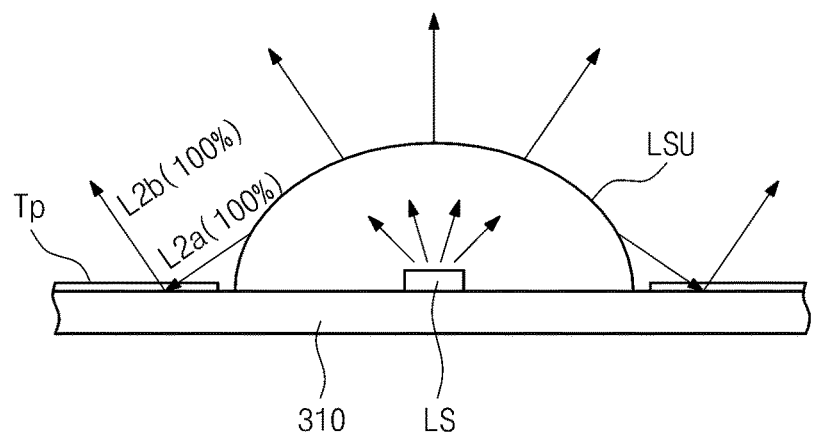
Figure 7:
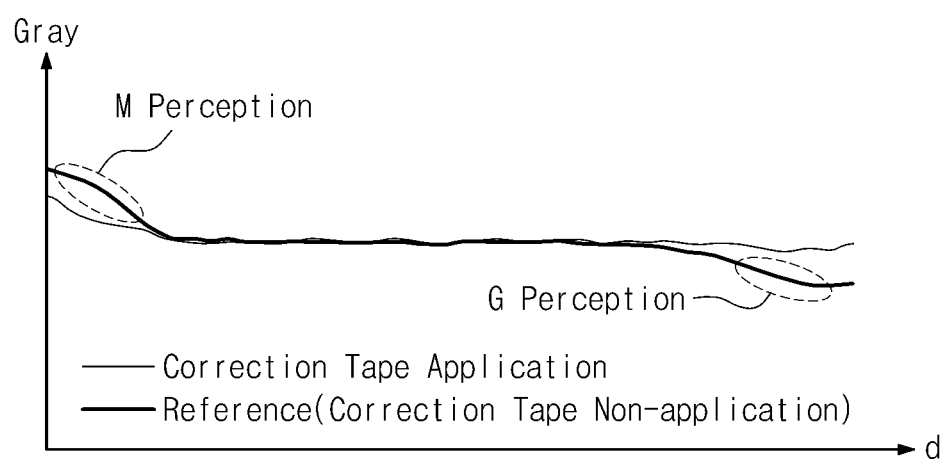
FIG. 7 is a graph showing a variation of color stain when the correction tape is used according to an exemplary embodiment of the disclosure.

FIGS. 5 and 6 are views showing absorption or reflection of a correction tape as a function of a light output, and FIG. 7 is a graph showing a variation of color stain when the correction tape is used according to an exemplary embodiment of the disclosure.

Referring to FIGS. 5 and 6, in an exemplary embodiment, the light emitted from the light emitting element LS is diffused to the outside through a lens LSU. The lens LSU surrounds the light emitting element LS and is disposed on the reflective sheet 310. The lens LSU may be a side-emitting lens, but not being limited thereto. Alternatively, the lens LSU may be a top-emitting lens.

In an exemplary embodiment, the light emitted from the light emitting element LS is diffused through the lens LSU. In such an embodiment, a portion of the diffused light by the lens LSU reaches to the correction tape Tp. As described above, the correction tape Tp absorbs of reflects the light in accordance with the color of the light.

In an exemplary embodiment, the color component of the light shown in FIG. 5 is different from the color component of the correction tape Tp and the color component of the light shown in FIG. 6 is the same as the color component of the correction tape Tp.

In an exemplary embodiment, as shown in FIG. 5, a first incident light L1a exiting from the lens LSU is provided to the reflective sheet 310 through the correction tape Tp. In such an embodiment, a light amount of a first reflection light L1b reflected by the reflective sheet 310 is reduced compared with a light amount of the first incident light L1a since a portion of the first incident light L1a is absorbed by the correction tape Tp.

In an exemplary embodiment, as shown in FIG. 4, the first correction tape Tp1 has the green color among the red, green, and blue colors. In such an embodiment, the first color areas Cp1 included in the first correction tape Tp1 have the green color. In such an embodiment, the first correction tape Tp1 absorbs a portion of the red and blue lights emitted from the first edge light emitting elements LP (refer to FIG. 3), and then reflects the other portion of the red and blue lights. Accordingly, the color stain may be effectively prevented from occurring in the first edge area of the display panel 100 (refer to FIG. 1).

In an exemplary embodiment, as shown in FIG. 6, a second incident light L2a exiting from the lens LSU is provided to the reflective sheet 310 through the correction tape Tp. In such an embodiment, a light amount of the second reflection light L2b reflected by the reflective sheet 310 is substantially the same as a light amount of the second incident light L2a. In such an embodiment, the second incident light L2a is not absorbed by the correction tape Tp because the color component of the light emitted from the light emitting element LS is substantially the same as the color component of the correction tape Tp.

In FIG. 7, an x-axis indicates a distance d in which the light emitting elements are arranged in the row direction shown in FIG. 4 and a y-axis indicates a grayscale value of the image displayed on the display panel 100.

Referring to FIGS. 4 and 7, the red and blue light emitting elements R and B corresponding to the first edge light emitting elements LP (refer to FIG. 3) are repeatedly arranged on the first and second driving circuit boards PCB1 and PCB2 along the column direction.

If the first correction tape Tp1 is not disposed in the first edge area PL of the reflective sheet 310, the light emitted from the first edge light emitting elements LP may not include the green component. As a result, the color stain of the magenta component M may be perceived in the first edge area of the display panel 100.

If the second correction tape Tp2 is not disposed in the second edge area PR of the reflective sheet 310, the light emitted from the second edge light emitting elements RP may not include the magenta component. As a result, the color stain of the green component G may be perceived in the second edge area of the display panel 100.

Figure 8:
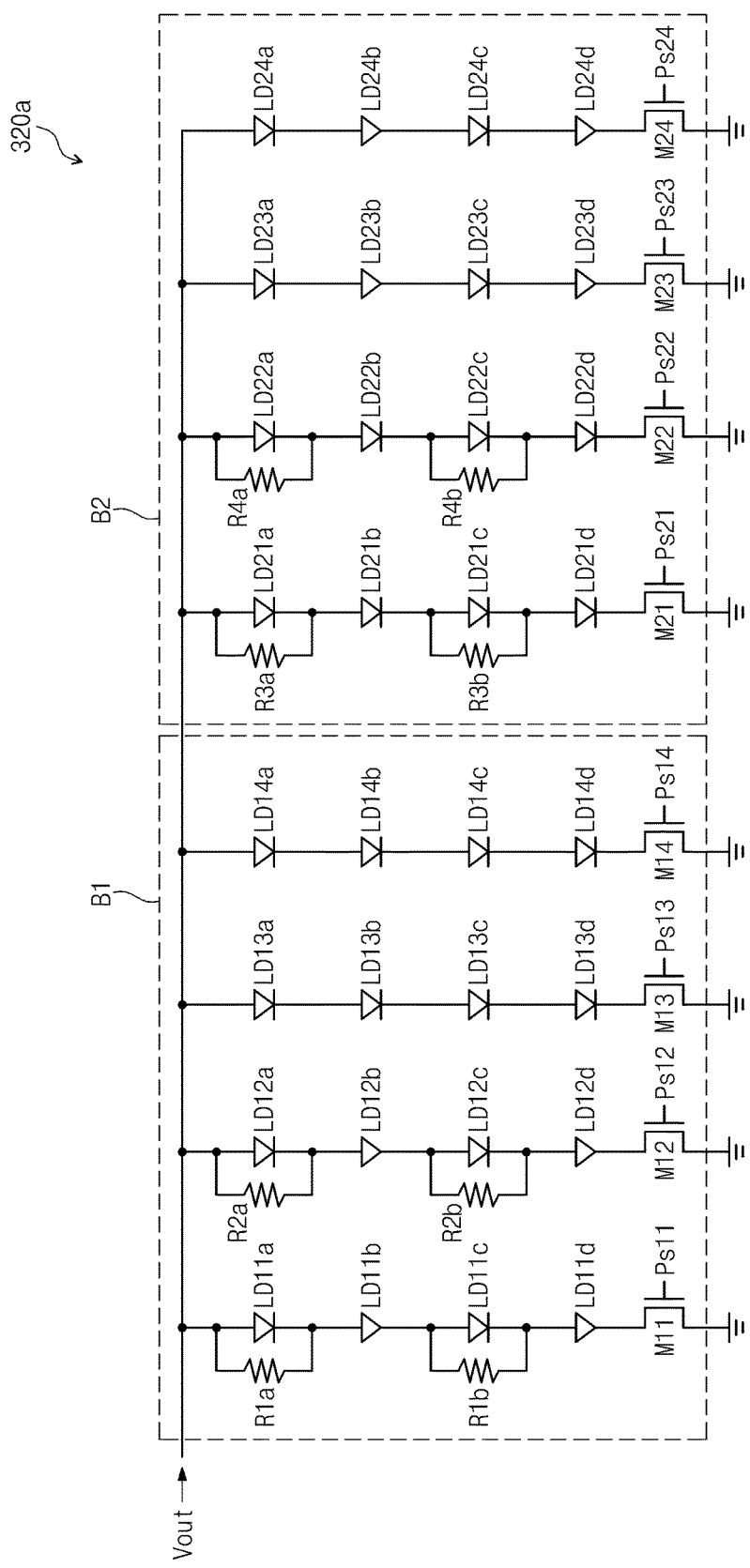
FIG. 8 is a circuit diagram showing light emitting elements arranged on the driving circuit board shown in FIG. 3.

FIG. 8 is a circuit diagram showing the light emitting elements arranged on the driving circuit board shown in FIG. 3. According to an exemplary embodiment, each of the first and second edge light emitting elements LP and RP shown in FIG. 3 may be connected to a resistor in parallel. In such an embodiment, when the color combination of the light emitted from the first and second edge light emitting elements LP and RP is not uniform, an amount of current provided to the first and second edge light emitting elements LP and RP may be controlled.

In an exemplary embodiment, the light emitted from the first edge light emitting elements LP, which emit the red and blue lights, has relatively small green component. In such an embodiment, the light emitting elements included in the first edge light emitting elements LP are connected to the resistor in parallel. In such an embodiment, the amount of current provided to the first edge light emitting elements LP is controlled, and thus the light amount of the light emitted from the light emitting elements is controlled.

In an exemplary embodiment, the light emitted from the second edge light emitting elements RP, which emit the green and cyan lights, has relatively small magenta component. In such an embodiment the light emitting elements included in the second edge light emitting elements RP are connected to the resistor in parallel. In such an embodiment, the amount of current provided to the second edge light emitting elements RP is controlled, and thus the light amount of the light emitted from the light emitting elements is controlled.

FIG. 8 shows the first and second driving circuit boards PCB1 and PCB2 among the first to sixth driving circuit boards PCB1 to PCB6 shown in FIG. 4.

In an exemplary embodiment, first to fourth red light emitting elements LD11a to LD11d connected to each other in series, first to fourth blue light emitting elements LD12a to LD12d connected to each other in series, first to fourth green light emitting elements LD13a to LD13d connected to each other in series, and first to fourth cyan light emitting elements LD14a to LD14d connected to each other in series are disposed on the first driving circuit board PCB1. The first to fourth red light emitting elements LD11a to LD11d, first to fourth blue light emitting elements LD12a to LD12d, first to fourth green light emitting elements LD13a to LD13d, and first to fourth cyan light emitting elements LD14a to LD14d are connected to each other in parallel.

In such an embodiment, a first transistor M11 is connected to a source terminal of the fourth red light emitting element LD11d to control an operation of the first to fourth red light emitting elements LD11a to LD11d. A second transistor M12 is connected to a source terminal of the fourth blue light emitting element LD12d to control an operation of the first to fourth blue light emitting elements LD12a to LD12d. A third transistor M13 is connected to a source terminal of the fourth green light emitting element LD13d to control an operation of the first to fourth green light emitting elements LD13a to LD13d. A fourth transistor M14 is connected to a source terminal of the fourth cyan light emitting element LD14d to control an operation of the first to fourth cyan light emitting elements LD14a to LD14d.

The first to fourth transistors M11 to M14 are controlled by driving signals Ps11 to Ps14 respectively applied to gate terminals thereof.

Among the light emitting elements arranged on the first driving circuit board PCB1, the first and third red light emitting elements LD11a and LD11c and the first and third blue light emitting elements LD12a and LD12c are included in the first edge light emitting elements LP.

According to an exemplary embodiment, the first red light emitting element LD11a is connected to a first resistor R1a in parallel and the third red light emitting element LD11c is connected to a second resistor R1b in parallel. In such an embodiment, the amount of current applied to the first and third red light emitting elements LD11a and LD11c of the first driving circuit board PCB1 is reduced by the first and second resistors R1a and R1b. As a result, the amount of the light emitted from the first and third red light emitting elements LD1a and LD1c is reduced.

According to an exemplary embodiment, the first blue light emitting element LD12a is connected to a third resistor R2a in parallel and the third blue light emitting element LD12c is connected to a fourth resistor R2b in parallel. In such an embodiment, the amount of current applied to the first and third blue light emitting elements LD12a and LD12c of the first driving circuit board PCB1 is reduced by the third and fourth resistors R2a and R2b. As a result, the amount of the light emitted from the first and third blue light emitting elements LD12a and LD12c is reduced.

In an exemplary embodiment, first to fourth red light emitting elements LD21a to LD21d connected to each other in series, first to fourth blue light emitting elements LD22a to LD22d connected to each other in series, first to fourth green light emitting elements LD23a to LD23d connected to each other in series, and first to fourth cyan light emitting elements LD24a to LD24d connected to each other in series are disposed on the second driving circuit board PCB2. The second driving circuit board PCB2 includes the light emitting elements having the same configurations as those of the first driving circuit board PCB1, and thus details thereof will be omitted.

According to an exemplary embodiment, the first red light emitting element LD21a is connected to a fifth resistor R3a in parallel, and the third red light emitting element LD21c is connected to a sixth resistor R3b in parallel. In such an embodiment, the amount of current applied to the first and third red light emitting elements LD21a and LD21c of the second driving circuit board PCB2 is reduced by the fifth and sixth resistors R3a and R3b. As a result, the amount of the light emitted from the first and third red light emitting elements LD21a and LD21c is reduced.

According to an exemplary embodiment, the first blue light emitting element LD22a is connected to a seventh resistor R4a in parallel and the third blue light emitting element LD22c is connected to an eighth resistor R4b in parallel. In such an embodiment, the amount of current applied to the first and third blue light emitting elements LD22a and LD22c of the second driving circuit board PCB2 is reduced by the seventh and eighth resistors R4a and R4b. As a result, the amount of the light emitted from the first and third blue light emitting elements LD22a and LD22c is reduced.

Although not shown in figures, the fifth and sixth driving circuit boards PCB5 and PCB6, on which the second edge light emitting elements RP are mounted, may have a structure substantially the same as the structure of the first and second driving circuit boards PCB1 and PCB2. In such an embodiment, each of the light emitting elements included in the second edge light emitting elements RP is connected to a resistor in parallel, and any repetitive detailed descriptions of the fifth and sixth driving circuit boards PCB5 and PCB6 will be omitted.

Figure 9:
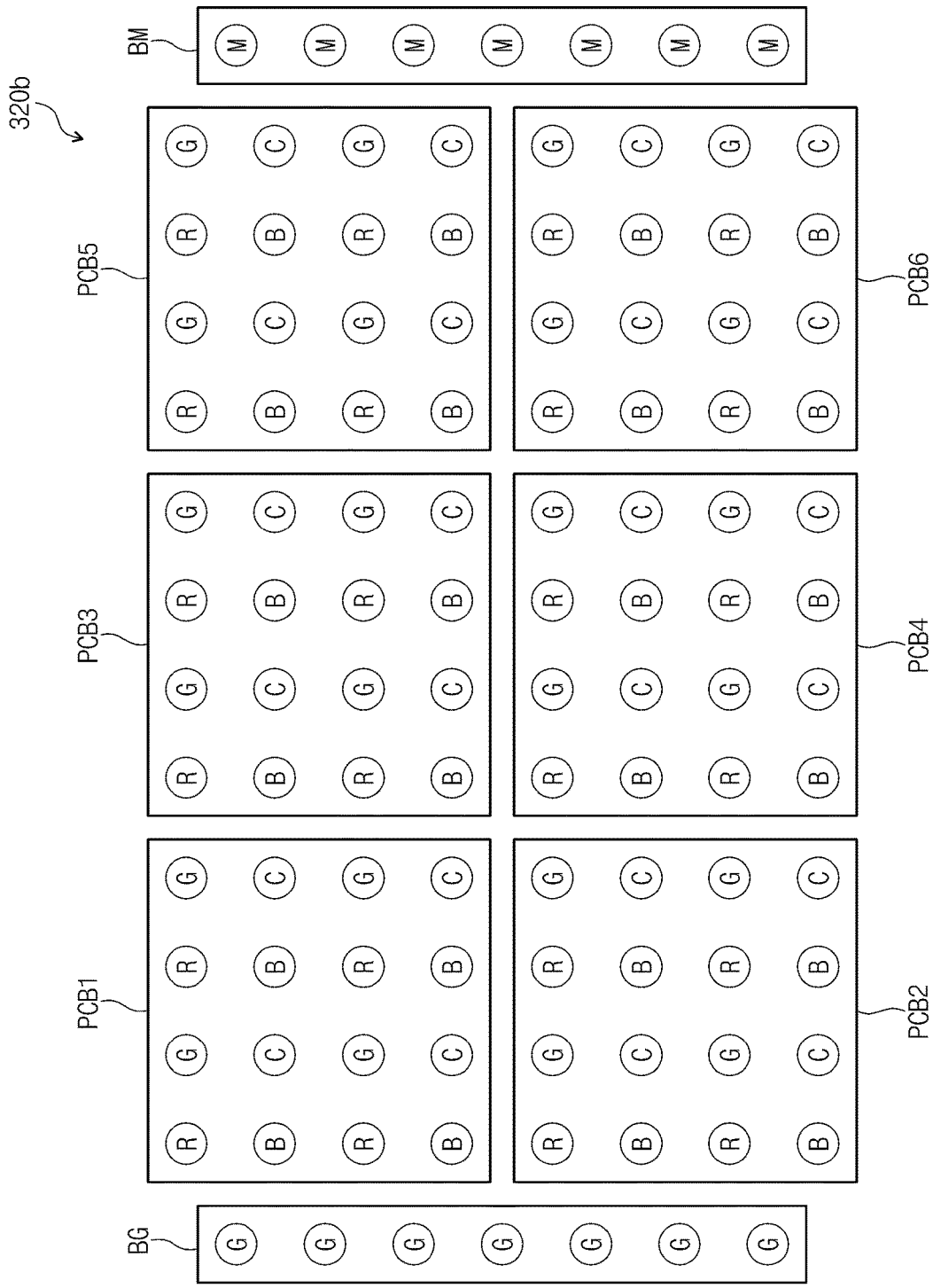
FIG. 9 is a block diagram showing a driving circuit board according to another exemplary embodiment of the disclosure.
Figure 10:
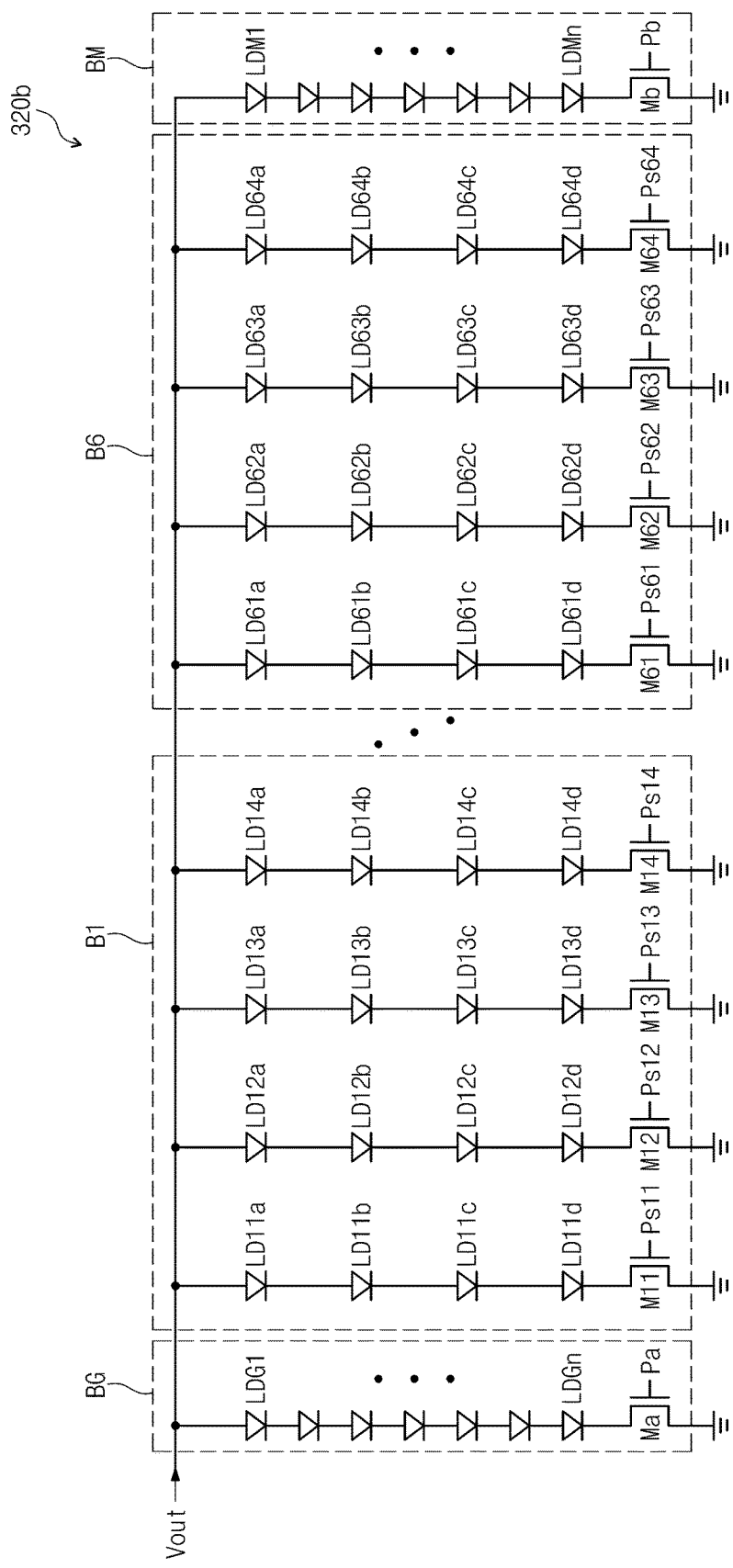
FIG. 10 is a circuit diagram showing light emitting elements arranged on the driving circuit board shown in FIG. 9.

FIG. 9 is a block diagram showing a driving circuit board according to another exemplary embodiment of the disclosure, and FIG. 10 is a circuit diagram showing light emitting elements arranged on a driving circuit board shown in FIG. 9.

Referring to FIGS. 1, 9 and 10, in an exemplary embodiment, a light source 320b includes first to sixth driving circuit boards PCB1 to PCB6 disposed on the bottom portion 411 of the first cover member 410, and may further include first and second auxiliary driving circuit boards BG and BM disposed on the first and second sidewalls 412a and 412b (shown in FIG. 2).

The first to sixth driving circuit boards PCB1 to PCB6 shown in FIG. 9 have the same structure and function as those of the first to sixth driving circuit boards shown in FIG. 3 except for the resistors. In such an embodiment, differently from the first and second edge light emitting elements LP and RP shown in FIG. 3, first and second edge light emitting elements LP and RP shown in FIG. 9 are not connected to the resistors in parallel.

In an exemplary embodiment shown in FIG. 1, the third correction tape Tp3 is disposed on the sidewalls 412. In an alternative exemplary embodiment, as shown in FIG. 9, the first and second auxiliary driving circuit boards BG and BM are disposed on the sidewalls 412 rather than the third correction tape Tp3.

In such an embodiment, the first auxiliary driving circuit board BG and a plurality of first compensation light emitting elements LDG1 to LDGn disposed on the first auxiliary driving circuit board BG are disposed on the first sidewall 412a (refer to FIG. 2). In such an embodiment, the first edge light emitting elements LP emit the light having the green component. The second auxiliary driving circuit board BM and a plurality of second compensation light emitting elements LDM1 to LDMn disposed on the second auxiliary driving circuit board BM are disposed on the second sidewall 412b (refer to FIG. 2). In such an embodiment, the second edge light emitting elements RP emit the light having the magenta component.

Figure 11:
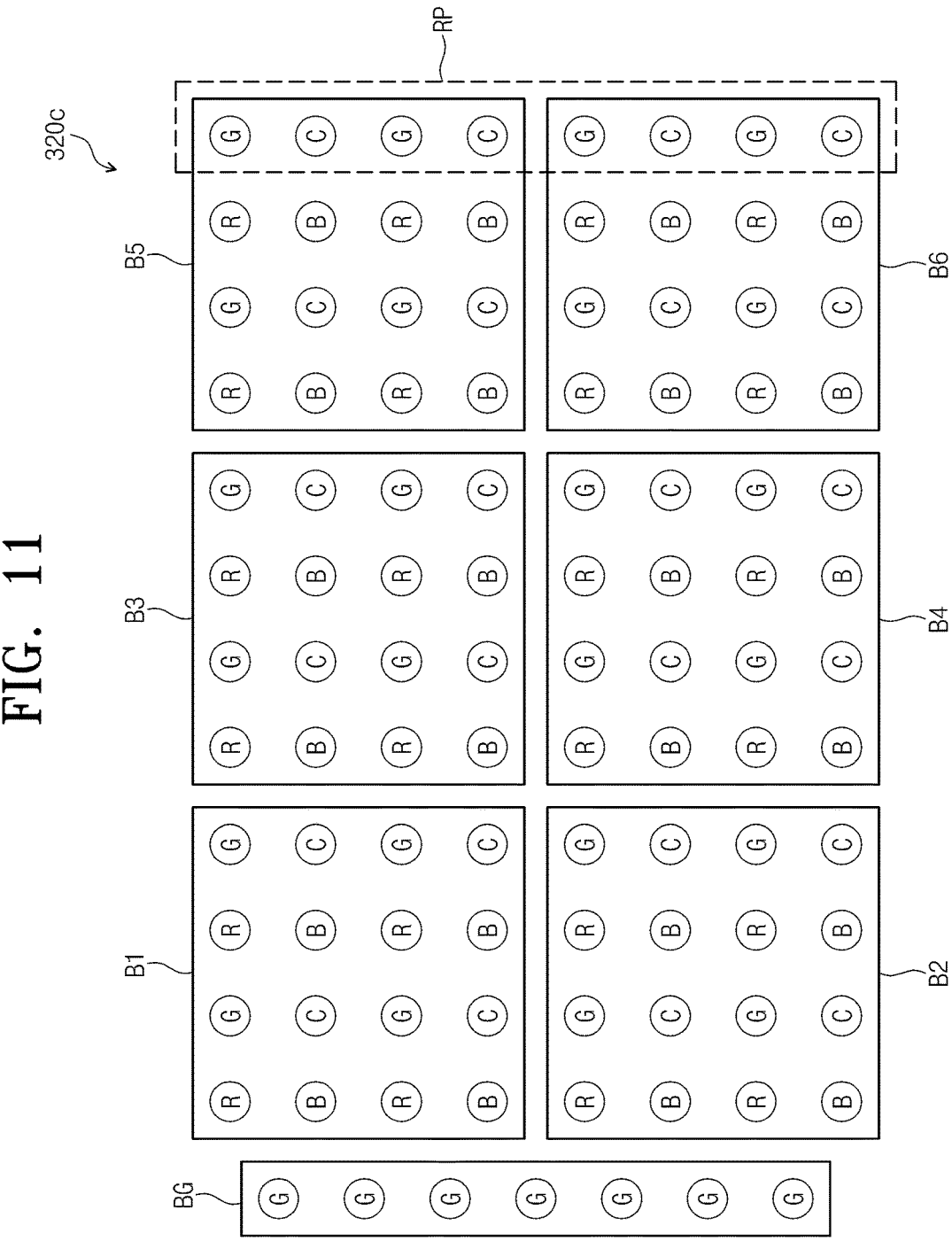
FIG. 11 is a block diagram showing a driving circuit board according to another exemplary embodiment of the disclosure.
Figure 12:
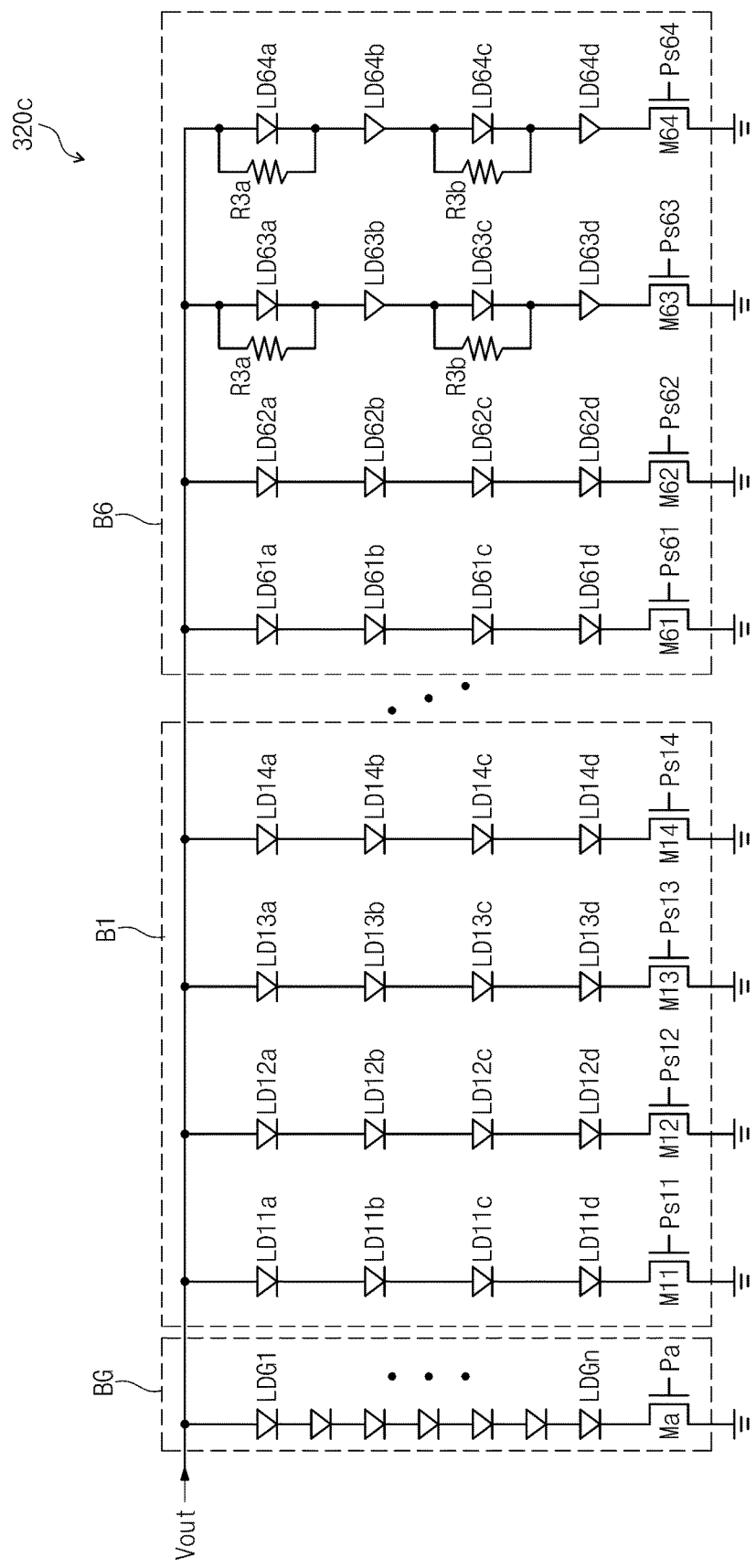
FIG. 12 is a circuit diagram showing light emitting elements arranged on the driving circuit board shown in FIG. 11.

FIG. 11 is a block diagram showing a driving circuit board according to another exemplary embodiment of the disclosure, and FIG. 12 is a circuit diagram showing light emitting elements arranged on a driving circuit board shown in FIG. 11.

Referring to FIGS. 1, 11, and 12, in an exemplary embodiment, a light source 320c includes a plurality of driving circuit boards disposed on the bottom portion 411 of the first cover member 410 and an auxiliary driving circuit board disposed on the sidewall 412.

Differently from the first edge light emitting elements LP shown in FIG. 3, the first edge light emitting elements LP shown in FIG. 11 are not connected to resistors in parallel.

In such an embodiment, the auxiliary driving circuit board is disposed on the sidewall 412 disposed adjacent to an edge area of the first and second edge areas of the reflective sheet. In such an embodiment, the auxiliary driving circuit board BG is disposed on the first sidewall 412a (refer to FIG. 2) disposed adjacent to the first edge area.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a display panel curved in a first direction;
a light source comprising a plurality of driving circuit boards, and a plurality of light emitting elements disposed on the driving circuit boards;
a reflective sheet disposed on the driving circuit boards and comprising a first edge area, a second edge area spaced apart from the first edge area in the first direction, and a center area disposed between the first and second edge areas, wherein a plurality of holes are defined in the center area to expose the light emitting elements;
a cover member comprising a bottom portion, on which the driving circuit boards are disposed, and sidewalls bent from the bottom portion;
a first correction tape disposed on the first edge area of the reflective sheet;
a second correction tape disposed on the second edge area of the reflective sheet; and
third correction tapes disposed on sidewalls facing each other in the first direction among the sidewalls,
wherein
the first correction tape displays a first color different from a color of a light emitted from first edge light emitting elements disposed adjacent to the first edge area among the light emitting elements, and
the second correction tape displays a second color different from a color of a light emitted from second edge light emitting elements disposed adjacent to the second edge area among the light emitting elements.

2. The display device of claim 1, wherein
the first edge light emitting elements comprise:
first light emitting elements which display one color of red, green, blue and cyan colors; and
second light emitting elements which display another color of the red, green, blue and cyan colors, and
the second edge light emitting elements comprise:
third light emitting elements which display another color of the red, green, blue and cyan colors; and
fourth light emitting elements which display the other color of the red, green, blue and cyan colors.

3. The display device of claim 2, wherein
the first light emitting elements display one color of the red, green and blue colors,
the second light emitting elements display another color of the red, green and blue colors, and
the first correction tape displays the other color of the red, green and blue colors, as the first color.

4. The display device of claim 3, wherein
a third correction tape of the third correction tapes, which is disposed on a first sidewall adjacent to the first edge area among the sidewalls, displays the first color.

5. The display device of claim 2, wherein
the third light emitting elements display one color of the red, green and blue colors, and
the fourth light emitting elements display a color obtained by mixing remaining two colors of the red, green and blue colors, which are not displayed by the third light emitting elements, as the second color.

6. The display device of claim 5, wherein a third correction tape of the third correction tapes, which is disposed on a second sidewall adjacent to the second edge area among the sidewalls, displays the second color.

7. The display device of claim 2, wherein
the first correction tape comprises a plurality of first color areas arranged at every first distance, and
a third correction tape of the third correction tapes, which is disposed on a first sidewall adjacent to the first edge area among the sidewalls, comprises a plurality of second color areas arranged at every second distance.

8. The display device of claim 7, wherein a total sum of areas of the first color areas is greater than a total sum of areas of the second color areas.

9. The display device of claim 8, wherein
the first distance is substantially equal to the second distance, and
an area of each of the first color areas is greater than an area of each of the second color areas.

10. The display device of claim 7, wherein
the first distance is smaller than the second distance, and
an area of each of the first color areas is substantially equal to an area of each of the second color areas.

11. The display device of claim 7, further comprising:
a fourth correction tape disposed between the first edge light emitting elements and light emitting elements disposed most adjacent to the first edge light emitting elements; and
a fifth correction tape disposed between the second edge light emitting elements and light emitting elements disposed most adjacent to the second edge light emitting elements.

12. The display device of claim 11, wherein
the fourth correction tape displays one color of the red, green and blue colors, which is substantially the same as the first color, and
the fifth correction tape displays a color obtained by mixing remaining two colors of the red, green and blue colors, which is substantially the same as the second color.

13. The display device of claim 1, wherein
the first edge light emitting elements comprise:
first light emitting elements which display one color of the red, green and blue colors; and
second light emitting elements which display another color of the red, green and blue colors, and
the first correction tape displays the other color of the red, green and blue colors, as the first color.

14. The display device of claim 13, wherein
the second edge light emitting elements comprise:
third light emitting elements which display the first color the same as the first correction tape among the red, green, and blue colors; and
fourth light emitting elements which display a cyan color, and
the second correction tape displays a color obtained by mixing remaining two colors not displayed by the third light emitting elements among the red, green, and blue colors as the second color.

15. The display device of claim 14, wherein the first correction tape displays the green color as the first color and the second correction tape displays a mixed color of the remaining two colors, as the second color.

16. The display device of claim 13, wherein the second edge light emitting elements comprise:
third light emitting elements which display substantially the same color as the first light emitting elements; and
fourth light emitting elements which display substantially the same color as the second light emitting elements.

17. The display device of claim 16, wherein the second correction tape displays the second color, which is substantially the same as the first color.

18. The display device of claim 1, further comprising:
a fourth correction tape disposed on sidewalls facing each other in a second direction crossing the first direction among the sidewalls,
wherein the fourth correction tape is disposed at an edge area of the sidewalls facing each other in the second direction.

19. A display device comprising:
a display panel curved in a first direction;
a light source comprising a plurality of driving circuit boards and a plurality of light emitting elements disposed on the driving circuit boards;
a reflective sheet disposed on the driving circuit boards and comprising a first edge area, a second edge area spaced apart from the first edge area in the first direction, and a center area disposed between the first and second edge areas, wherein the light emitting elements are disposed in the center area;
a bottom cover comprising a bottom portion, on which the driving circuit boards are disposed, and sidewalls bent from the bottom portion;
a first correction tape disposed on the first edge area; and
a second correction tape disposed the second edge area, wherein
the first correction tape displays a first color different from a color of a light emitted from first edge light emitting elements disposed adjacent to the first edge area among the light emitting elements,
the second correction tape displays a second color different from a color of a light emitted from second edge light emitting elements disposed adjacent to the second edge area among the light emitting elements, and
at least one of the first and second edge light emitting elements is connected to a resistor in parallel.

* * * * *